US011877210B2

(12) United States Patent
Carbonnel et al.

(10) Patent No.: US 11,877,210 B2
(45) Date of Patent: Jan. 16, 2024

(54) METHOD AND DEVICE FOR ASSISTING THE POSITIONING OF A DEVICE CAPABLE OF CONNECTING TO A WI-FI LOCAL AREA NETWORK OF A HOME GATEWAY OF A USER

(71) Applicant: ORANGE, Issy-les-Moulineaux (FR)

(72) Inventors: Louis-Xavier Carbonnel, Chatillon (FR); Yoann Vincent, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 292 days.

(21) Appl. No.: 17/294,177

(22) PCT Filed: Oct. 17, 2019

(86) PCT No.: PCT/FR2019/052469
§ 371 (c)(1),
(2) Date: May 14, 2021

(87) PCT Pub. No.: WO2020/099743
PCT Pub. Date: May 22, 2020

(65) Prior Publication Data
US 2022/0007146 A1 Jan. 6, 2022

(30) Foreign Application Priority Data
Nov. 15, 2018 (FR) ...................................... 1871539

(51) Int. Cl.
*H04W 4/029* (2018.01)
*H04W 4/33* (2018.01)
*H04W 84/12* (2009.01)

(52) U.S. Cl.
CPC ............. *H04W 4/029* (2018.02); *H04W 4/33* (2018.02); *H04W 84/12* (2013.01)

(58) Field of Classification Search
CPC ....... H04W 4/029; H04W 4/33; H04W 84/12; H04W 4/02; H04W 84/18; H04W 64/00;
(Continued)

(56) References Cited

U.S. PATENT DOCUMENTS

| 2014/0106738 A1* | 4/2014 | Ostrup | H04W 24/02 |
| | | | 455/422.1 |
| 2018/0249341 A1* | 8/2018 | Park | H04W 24/10 |

FOREIGN PATENT DOCUMENTS

| CN | 105101406 A | * 11/2015 |
| JP | 2016139893 A | 8/2016 |

(Continued)

OTHER PUBLICATIONS

English translation of the Written Opinion of the International Searching Authority dated Jan. 30, 2020 for corresponding International Application No. PCT/FR2019/052469, filed Oct. 17, 2019.
(Continued)

*Primary Examiner* — Srilakshmi K Kumar
*Assistant Examiner* — Jing Gao
(74) *Attorney, Agent, or Firm* — David D. Brush; Westman, Champlin and Koehler, P.A.

(57) ABSTRACT

A method and a device for assisting the positioning of a device capable of connecting to a Wi-Fi local area network of a domestic gateway of a user. Such a method is implemented by a mobile terminal placed in a domestic environment of the user. The Wi-Fi signal levels emitted by the mobile terminal and received by the domestic gateway originate from the domestic gateway, and at successive time intervals, and an average is calculated during a sliding time window and of a determined duration. This average is compared with a value of at least one determined threshold. A piece of information representative of the area of the domestic environment in which the mobile terminal is
(Continued)

Figure 1:
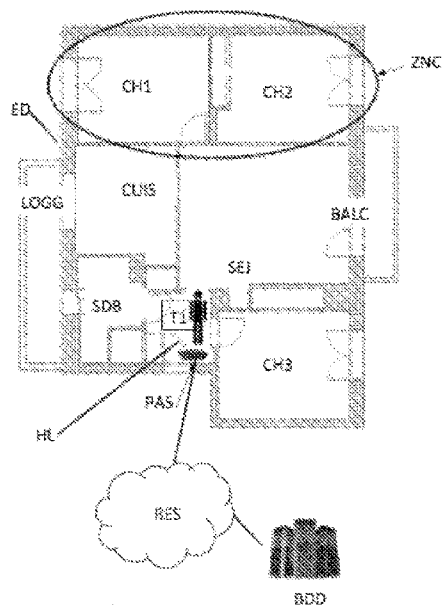

located with respect to the domestic gateway, is returned to the user.

11 Claims, 3 Drawing Sheets

(58) Field of Classification Search
CPC ....... H04W 8/005; H04W 4/80; H04W 4/023; H04W 24/08; H04W 88/16; H04W 72/23; H04W 56/0015; H04W 40/10; H04W 24/10; H04W 40/244; H04W 16/18; H04W 16/20; H04W 64/003; H04W 52/0229; H04W 4/38; H04W 4/025; H04W 74/006; H04W 52/0245; H04W 84/045; H04W 28/0236; H04W 12/63; H04W 36/30; H04W 48/14; H04W 36/245; H04W 40/20; H04W 52/241; H04W 52/245; G01S 5/14; G01S 5/02521; G01S 11/06; G01S 5/0236; G01S 5/0284; G01S 19/13; G01S 5/10; G01S 5/0027; G01S 5/0036; G01S 5/0054; G01S 5/0295; G01S 5/0242; G01S 13/46; G01S 13/56; G01S 7/497; G01S 15/89; G01S 2205/02; G01S 2205/09; G01S 5/02; G01S 5/0252; G01S 1/026

See application file for complete search history.

(56) References Cited

FOREIGN PATENT DOCUMENTS

| | | |
|---|---|---|
| WO | 2018060089 A1 | 4/2018 |
| WO | 2018166579 A1 | 9/2018 |

OTHER PUBLICATIONS

International Search Report dated Jan. 24, 2020 for corresponding International Application No. PCT/FR2019/052469, dated Oct. 17, 2019.
Written Opinion of the International Searching Authority dated Jan. 24, 2020 for corresponding International Application No. PCT/FR2019/052469, filed Oct. 17, 2019.

* cited by examiner

METHOD AND DEVICE FOR ASSISTING THE POSITIONING OF A DEVICE CAPABLE OF CONNECTING TO A WI-FI LOCAL AREA NETWORK OF A HOME GATEWAY OF A USER

1. CROSS-REFERENCE TO RELATED APPLICATION

This application is a Section 371 National Stage Application of International Application No. PCT/FR2019/052469, filed Oct. 17, 2019, the content of which is incorporated herein by reference in its entirety, and published as WO 2020/099743 on May 22, 2020, not in English.

2. FIELD OF THE INVENTION

The invention relates to the positioning, in a home environment, of equipment intended to communicate, using Wi-Fi technology, with a home gateway.

3. BACKGROUND

In order to extend the Wi-Fi coverage of a home local area network, it is known to install a home repeater device, also known as a Wi-Fi repeater, in the home environment of a user, for example his home. Such a Wi-Fi repeater acts as a relay between connected equipment placed in the home environment of the user and the home gateway serving as an access point to the IP (for Internet Protocol) network.

Such a Wi-Fi repeater is used in particular when certain locations in the home are not covered by the Wi-Fi local area network of the home gateway, for example because the home gateway is too far away or because obstacles are placed in the home environment (excessively thick walls, equipment interfering with the Wi-Fi signal).

When a user acquires a Wi-Fi repeater in order to extend the Wi-Fi coverage of his home gateway, one problem that is commonly encountered is that said user does not know where to place this Wi-Fi repeater. Since the user is not from the field of telecommunications, he often tends to place the Wi-Fi repeater in the area not covered by the Wi-Fi network of the home gateway. However, such a location does not make it possible to resolve problems in terms of connection and Wi-Fi services that he encounters in these areas, since the Wi-Fi repeater does not have access to the home gateway.

Correct positioning of the Wi-Fi repeater in the home environment is necessary in order to ensure a good quality of Wi-Fi service for the user.

Current positioning assistance mechanisms are very basic. For example, information LEDs may be available on the Wi-Fi repeater equipment itself in order to indicate whether the Wi-Fi repeater is correctly placed in relation to the home gateway, for example a certain number of LEDs turned on indicates a certain Wi-Fi signal quality. However, such LEDs do not indicate to the user whether the Wi-Fi repeater is optimally placed in relation to the home gateway. For example, the Wi-Fi repeater may be placed in an area allowing it to connect to the home gateway, but the Wi-Fi repeater may be placed in an area considered to be too close to the home gateway, since the corresponding Wi-Fi coverage extension is not maximum, and another location of the Wi-Fi repeater further away from the home gateway might be more expedient.

In addition, the LED-based information is provided to the user only once the Wi-Fi repeater has been connected and started. If the Wi-Fi repeater has been placed too far away from the home gateway, the user has to turn off and disconnect the device and carry out the installation again at another location.

It is thus not a simple matter for a user to ascertain the optimum location of a Wi-Fi repeater in his home environment.

4. SUMMARY

The invention aims to improve the prior art.

To this end, it relates to a method for assisting with the positioning of an equipment capable of connecting to a Wi-Fi local area network of a home gateway of a user. Such a method is implemented by a mobile terminal placed in the home environment of the user, and comprises the following steps:

- receiving, from the home gateway, and at successive time intervals, information representative of a level of a Wi-Fi signal emitted by the mobile terminal and received by the home gateway,
- calculating an average signal level value from signal levels received by the mobile terminal during a sliding time window of a determined duration,
- comparing the average signal level value with a value of at least one determined threshold,
- outputting, to a user of the mobile terminal, information representative of the area of the home environment in which the mobile terminal is located with respect to the home gateway, on the basis of the results of the comparison.

According to the invention, it is thus possible to assist a user with the placement of an equipment intended to connect to a local area network of a home gateway in Wi-Fi mode. In particular, by virtue of the method according to the invention, the area of the home environment in which the mobile terminal is located is determined based on a Wi-Fi signal level emitted by the mobile terminal placed in this area and received by the home gateway. The method according to the invention may for example be implemented by an application installed on the mobile terminal implementing the invention. Advantageously, the method according to the invention uses the Wi-Fi signal level emitted by the mobile terminal and received by the home gateway.

For example, the home equipment to be placed in the home environment of the user may be a Wi-Fi repeater, or any equipment intended to connect to the Wi-Fi local area network of the home gateway, such as a TV decoder, a connected speaker, a voice assistant, a radio, etc.

Advantageously, in order to avoid variations in the signal level emitted by the mobile terminal and received by the home gateway, an average of the signal level values received over a time window is used.

According to one particular embodiment of the invention, the comparison step comprises the following sub-steps:

- when said average value is greater than said value of the determined threshold, determining that the mobile terminal is placed in a first area of the home environment,
- when said average value is less than or equal to said value of the determined threshold, determining that the mobile terminal is placed in a second area of the home environment.

Advantageously according to this embodiment, the mobile terminal may determine the area that is too close or too far away or the optimum area under the conditions in which the home equipment to be installed in the optimum area will be used.

Such determination is performed using a comparison of the strength of the signal emitted by the mobile terminal and received by the home gateway with determined threshold values. When the strength of the signal is greater than the threshold, the mobile terminal is placed in an area closer to the home gateway than the position that would correspond to a signal having a strength equal to the value of the threshold, and when the strength of the signal is less than the threshold, the mobile terminal is placed in an area further away from the home gateway than the position that would correspond to a signal having a strength equal to the value of the threshold.

According to one particular embodiment of the invention, the first area and the second area correspond respectively to an area said to be too close to the home gateway and to an area said to be optimum with respect to the home gateway, when the determined threshold corresponds to a first threshold, or the first area and the second area correspond respectively to an area said to be optimum with respect to the home gateway and to an area said to be too far away from the home gateway, when the determined threshold corresponds to a second threshold.

According to this particular embodiment, the value of the first threshold is greater than the value of the second threshold.

According to this particular embodiment of the invention, two separate thresholds are used to determine the area of the home environment in which the mobile terminal is located, and thus inform the user whether he is too close, too far away or in the optimum area for the placement of the home equipment. A first threshold makes it possible to determine a boundary between the area that is too close to the home gateway and the optimum placement area, and a second threshold makes it possible to determine a boundary between the optimum placement area and the area that is too far away from the home gateway. It will be understood that the first threshold is greater than the second threshold since, when the user moves away from the home gateway, the Wi-Fi signal level decreases.

By virtue of the information about an area that is too close, too far away or an optimum area, the user may then move with the mobile terminal in the home environment and identify the optimum placement area for the home equipment to be installed.

According to another particular embodiment of the invention, when the value of the determined threshold is equal to a first predetermined value and it is determined that the mobile terminal is located in the second area, the value of the determined threshold is assigned a second predetermined value greater than the first value. And, when the value of the determined threshold is equal to the second predetermined value and it is determined that the mobile terminal is located in the first area, the value of the determined threshold is assigned the first predetermined value.

According to this particular embodiment of the invention, a threshold-management hysteresis mechanism is used in order to control the oscillations between the areas when the mobile terminal is located at the boundary between the first area and the second area. Specifically, the signal level used by the method according to the invention is information that is constantly subject to variations, since it is influenced for example by the way in which the user holds his mobile terminal or by the position of the user with respect to his mobile terminal and to the home gateway. When the user is located close to the boundary between the first area and the second area, these variations may generate oscillations between the areas presented to the user. For example, even if the user holding the mobile terminal is no longer moving, the application may indicate to him that he is sometimes in the first area and that he is sometimes in the second area, the indication changing every 2 to 3 seconds. This could be confusing for the user. The hysteresis mechanism used in the particular embodiment described above makes it possible to improve the situation.

According to another particular embodiment of the invention, when it is determined that the mobile terminal is located in the second area and that the second area corresponds to the area said to be optimum with respect to the home gateway, the second value of the first threshold is increased by a third predetermined value, and when it is determined that the mobile terminal is located in the first area and that the first area corresponds to the area said to be optimum with respect to the home gateway, the first value of the second threshold is decreased by a fourth predetermined value.

According to this particular embodiment of the invention, the boundaries of the optimum area for placement of the home equipment are extended with respect to the theoretical boundaries defined on the basis of experimentally determined thresholds. Specifically, the number of signal level samples used to calculate the average should remain limited in order to avoid introducing inertia into the evaluation of the positioning of the home equipment. As a result, when the user holding the mobile terminal is located at the edge of the optimum region, a slight "stray" oscillation in the signal level may cause it to pass into the area that is too close or too far away. The hysteresis mechanism would then force him to move in order to return to the optimum area, while the user is however actually in the optimum area. To this end, according to the particular embodiment of the invention described here, the optimum area considered by the mobile terminal is extended in both directions (toward the area that is too close and toward the area that is too far away) with respect to the theoretical optimum area defined by the experimentally obtained thresholds.

According to one variant of this particular embodiment of the invention, the fourth value is greater than the third value. The extension of the optimum area is thus not symmetrical. The amplitude of extension at the boundary with the area that is "too far away" is greater than the amplitude of extension at the boundary with the area that is "too close". Indeed, at the boundary with the area that is "too far away", if it is indicated to the user that he is too far away, while in reality his position is still good, this limits the amplitude of the extension of the Wi-Fi coverage in the event that the home equipment is a Wi-Fi repeater.

On the other hand, at the boundary with the area that is "too close", it is not important to indicate to the user that he is too close, when in reality his position is in the optimum area, since the user will simply be encouraged to move the Wi-Fi repeater slightly further away from the home gateway, which will increase the amplitude of the Wi-Fi coverage extension.

According to another particular embodiment of the invention, the method furthermore comprises the mobile terminal obtaining at least one value of said threshold from a database. According to this particular embodiment of the invention, the values of the thresholds are stored in a database, for example in a server of the IP network. They may thus easily be updated and downloaded by the mobile terminal during the execution of the application for assisting with the positioning of a home equipment.

According to another particular embodiment of the invention, the at least one value is stored in association with at least one feature of the mobile terminal. According to this particular embodiment of the invention, the values of the thresholds stored in the database are dependent on the features of the mobile terminal. Specifically, the signal levels may differ depending on the features of the mobile terminal used to execute the application for assisting with the positioning of a home equipment. Since the optimum area should be almost similar regardless of the mobile terminal that is used, the particular embodiment of the invention described here makes it possible to adapt the used values of the thresholds on the basis of the mobile terminal used to execute the application for assisting with the positioning of a home equipment.

According to another particular embodiment of the invention, the at least one value is stored in association with at least one feature of said equipment to be positioned. According to this particular embodiment of the invention, the values of the thresholds that are stored in the database are dependent on features of the equipment to be positioned. Specifically, the Wi-Fi signal levels required for the correct operation of the equipment to be placed in the home environment of the user and that is intended to connect to the home gateway may be different depending on the type of equipment or the type of applications to be implemented on this equipment and that require a Wi-Fi connection.

For example, an optimum placement of the equipment may be different depending on whether the equipment is a connected speaker intended to receive only audio data or a connected television intended to receive video data.

The invention also relates to a device for assisting with the positioning of an equipment capable of connecting to a Wi-Fi local area network of a home gateway of a user, the positioning assistance device being intended to be moved in a home environment of the user. The positioning assistance device comprises at least one processor configured so as to:
- receive, from the home gateway, and at successive time intervals, information representative of a level of a Wi-Fi signal emitted by the mobile terminal and received by the home gateway,
- calculate an average signal level value from signal levels received by the mobile terminal during a time window of a determined duration,
- compare the average signal level value with a value of at least one determined threshold,
- output, to a user of the mobile terminal, information representative of the area of the home environment in which the mobile terminal is located with respect to the home gateway, on the basis of the results of the comparison.

According to one particular embodiment of the invention, such a device is contained in a terminal, such as a mobile terminal.

The invention also relates to a computer program comprising instructions for implementing the above method according to any one of the particular embodiments described above when said program is executed by a processor. The method may be implemented in various ways, in particular in hard-wired form or in the form of software.

This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may include a storage means, such as a ROM, for example a CD-ROM or a microelectronic circuit ROM, or else a magnetic recording means, for example a floppy disk or a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

5. LIST OF THE FIGURES

Figure 2:
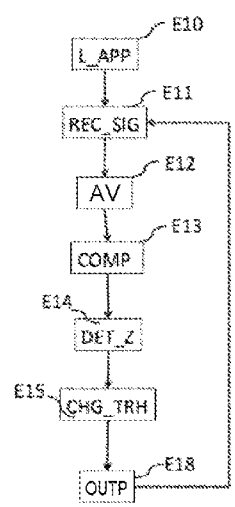
Figure 3A:
Figure 3B:
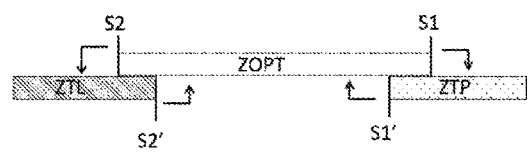
Figure 3C:
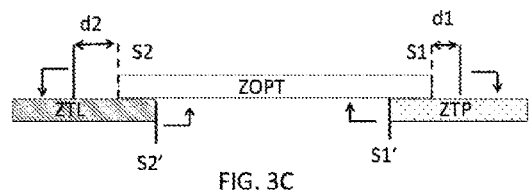
Figure 4A:
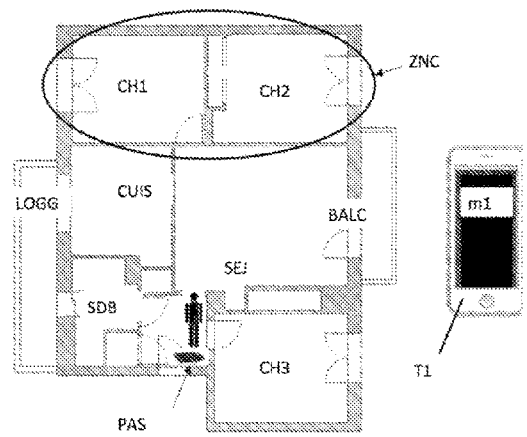
Figure 4B:
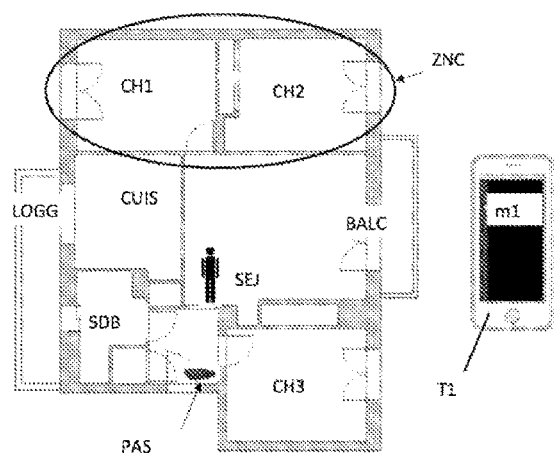
Figure 4C:
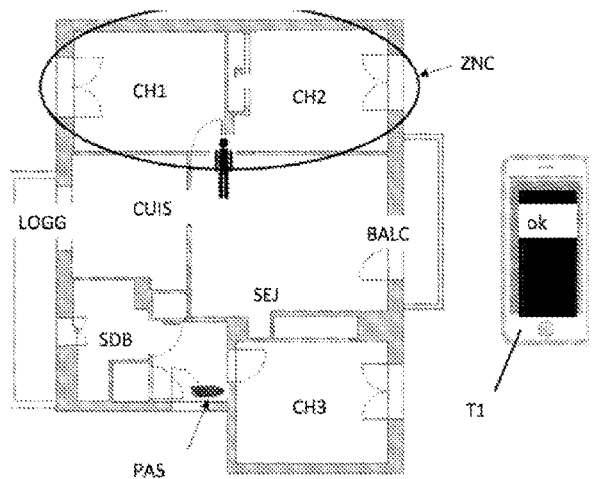
Figure 5:
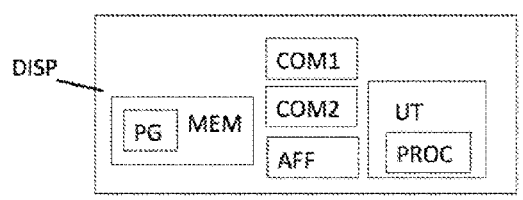

Other features and advantages of the invention will become more clearly apparent upon reading the following description of particular embodiments, provided by way of simple illustrative and nonlimiting examples, and the appended drawings, in which:

FIG. 1 illustrates an example of an environment for implementing the invention, according to one particular embodiment of the invention, FIG. 2 illustrates steps of the positioning assistance method according to one particular embodiment of the invention, FIG. 3A schematically illustrates areas of the home environment, when the positioning assistance method is implemented according to one particular embodiment of the invention, FIG. 3B schematically illustrates areas of the home environment, when the positioning assistance method is implemented according to another particular embodiment of the invention, FIG. 3C schematically illustrates areas of the home environment, when the positioning assistance method is implemented according to another particular embodiment of the invention, FIG. 4A schematically illustrates the home environment of a user and the determination of a placement area at a given time, during the execution of the positioning assistance method according to one particular embodiment of the invention, FIG. 4B schematically illustrates the home environment of a user and the determination of a placement area at another given time, during the execution of the positioning assistance method according to one particular embodiment of the invention, FIG. 4C schematically illustrates the home environment of a user and the determination of a placement area at another given time, during the execution of the positioning assistance method according to one particular embodiment of the invention, FIG. 5 illustrates a device configured so as to implement the positioning assistance method according to one particular embodiment of the invention.

6. DESCRIPTION OF ONE EMBODIMENT OF THE INVENTION

6.1 General Principle of the Invention

The positioning assistance method described here allows a user to find an optimum position for a home equipment requiring a Wi-Fi connection to the home gateway, such as for example a Wi-Fi repeater. Advantageously, it is not necessary to connect the Wi-Fi repeater beforehand.

The positioning assistance method is based on a dedicated application executed by a mobile terminal of the user, for example a smartphone.

This application is in continuous Wi-Fi communication with the home gateway of the user. By using the Wi-Fi signal level of the smartphone received by the home gateway (RSSI), the application indicates to the user in real time the suitability of the point where he is located for connecting his repeater there. In other words, the application indicates to him whether he is at an optimum distance from the home gateway. Thus, generally speaking, two areas are determined: an area said to be optimum, corresponding to the locations located at an optimum distance from the home gateway, and an area said to be non-optimum, corresponding to all locations located at a non-optimum distance from the home gateway. Such a non-optimum area may correspond to an area that is too far away from the home gateway and that does not allow an adequate quality of Wi-Fi service, or to an area that is too close to the home gateway and that does not allow sufficiently far-ranging extension of the Wi-Fi coverage.

According to one particular embodiment of the invention, three areas may be determined, for example:
- an area located at an optimum distance from the home gateway,
- an area that is too far away from the home gateway, and
- an area that is too close to the home gateway.

According to One Particular Embodiment

In order to distinguish between these two or three areas, the application is based on RSSI thresholds, which have been calculated on the basis of measurements carried out in the laboratory.

These thresholds make it possible to determine the "boundary" between the areas that are "too close" and "optimum" and between the areas that are "optimum" and "too far away". However, the RSSI used for positioning assistance, by its nature, is information that is constantly subject to variations, since it is influenced for example by the way in which the user holds his smartphone, or by the position of the user with respect to his smartphone and to his home gateway.

When the user is located close to the boundaries between positioning areas, these variations could generate oscillations between the areas presented to the user. Thus, even if the user is no longer moving, the application could for example indicate to him sometimes the area that is "too close" and sometimes the "optimum" area, the indication changing every 2 to 3 seconds.

This would be confusing for the user, and would hamper the correct positioning of a Wi-Fi repeater.

Thus, according to particular embodiments of the invention, various mechanisms are proposed in order to solve this problem:
- using the average of the last RSSI values rather than the instantaneous value of the RSSI,
- modifying the thresholds on the basis of the area in which the user is located (hysteresis mechanism),
- extending the "optimum" area (to a limited extent) in order to compensate for the impact of the residual oscillation of the RSSI, which may remain even after averaging.

These various embodiments will be described later on.

6.2 Particular Embodiments of the Invention

FIG. 1 illustrates an example of an environment for implementing the invention, according to one particular embodiment of the invention.

Such an implementation environment comprises a home environment ED of a user, illustrated in FIG. 1 in the form of a layout of the home of the user. The home environment comprises for example 3 bedrooms CH1, CH2, CH3, a living room SEJ with a balcony BALC, a kitchen CUIS and a loggia LOGG, a bathroom SDB and a hall HL.

The implementation environment comprises a home gateway PAS connected to an IP (for Internet Protocol) communication network Res. In the home environment illustrated in FIG. 1, the home gateway PAS is placed in the hall HL. The home gateway PAS is configured so as firstly to exchange data with servers or terminals via the communication network Res, and secondly to establish a Wi-Fi wireless local area network in the home environment ED. Thus, home equipment of the user that are placed in the home environment ED are able to communicate to/from the communication network Res via the Wi-Fi local area network of the home gateway PAS. In FIG. 1, an area ZNC not covered by the Wi-Fi local area network of the home gateway is illustrated. In this uncovered area ZNC, when the user wishes to use a home equipment requiring a connection to the Wi-Fi local area network of the home gateway PAS, the Wi-Fi service is too weak or even non-existent since the area ZNC is too far away from the home gateway PAS or obstacles impacting the Wi-Fi links are placed between the area ZNC and the home gateway PAS. By virtue of the positioning assistance method, a Wi-Fi repeater may be installed at an optimum location in the home environment of the user so as to extend the Wi-Fi coverage of the home gateway PAS. Optimum location is understood here to mean a location in the home environment that allows an optimum Wi-Fi coverage extension that makes it possible to ensure Wi-Fi connections to home equipment with a guaranteed and undisturbed quality of service, while at the same time offering Wi-Fi coverage that is as far-ranging as possible. In other words, this is a location that is neither too close nor too far away from the home gateway.

To this end, the positioning assistance method is implemented by a mobile terminal T1, for example a smartphone, on which an application for assisting with the positioning of the repeater has been downloaded and installed. The terminal T1 is configured so as to communicate with the home gateway PAS, for example via the Wi-Fi local area network of the home gateway PAS.

During the execution of the positioning assistance method by the terminal T1, the user moves in the home environment ED and the terminal T1 outputs to him in real time information indicating to him whether the location at which he is located is an optimum location for placing a Wi-Fi repeater.

According to one particular embodiment of the invention, the implementation environment also comprises a database BDD configured so as to store Wi-Fi signal level thresholds used by the positioning assistance method. Such a database BDD is for example connected to the communication network Res in order to communicate with the terminal T1.

The implementation environment has been described above in the case of assisting with the positioning of a Wi-Fi repeater, but the positioning assistance method may also be used to place different home equipment in the home environment of the user. For example, such home equipment may be a connected television, or a TV decoder requiring a Wi-Fi connection to the home gateway in order to receive data streams. Hereinafter, the term Wi-Fi equipment will be used to denote both a Wi-Fi repeater installed in the home environment or such home equipment requiring a Wi-Fi connection to the home gateway PAS.

FIG. 2 illustrates steps of the positioning assistance method according to one particular embodiment of the invention.

In a step E10, the user launches the execution of the application for assisting with the positioning of a Wi-Fi equipment, which he has installed beforehand on his terminal T1.

In a step E11, the terminal T1 receives, from the home gateway PAS, and at successive time intervals, information representative of a level of a Wi-Fi signal emitted by the terminal T1 and received by the home gateway PAS, also known by the name RSSI for Received Signal Strength Indication. For example, in step E11, the application executed by the terminal T1 calls a Web API of the home gateway PAS to obtain the RSSI signal level that it has received from the terminal T1, and the home gateway PAS transmits such a signal level thereto.

In a step E12, the terminal T1 calculates an average value of the RSSI levels received during a sliding time window of a determined duration.

For example, such a duration may be 2 seconds. Other values are possible. The longer the duration, the more the latency of the method will be impacted.

In a step E13, the terminal T1 compares the average value of the RSSI levels with a value of a determined threshold.

In a step E14, the area in which the mobile terminal is located is determined from among a first area Z1 and a second area Z2. When the average value is greater than the value of the determined threshold, it is determined that the mobile terminal T1 is placed in the first area Z1 of the home environment. When the average value is less than or equal to the value of the determined threshold, it is determined that the mobile terminal T1 is placed in the second area Z2 of the home environment.

For example, according to this particular embodiment of the invention, the user wishes to install a TV decoder receiving audio/video data streams from the home gateway in Wi-Fi mode. To this end, two areas are defined: an area Z1, said to be an optimum area, in which the Wi-Fi signal level will be sufficient to receive audio/video streams with a good quality of service, and an area Z2, said to be too far away, in which the Wi-Fi signal level will not be sufficient to ensure a good quality of service for the Wi-Fi TV decoder.

In a step E18, the mobile terminal T1 outputs to the user information representative of the area Z1 or Z2 of the home environment in which the mobile terminal T1 is located with respect to the home gateway PAS. For example, it displays to said user a message indicating an area that is too far away or an optimum area.

The method then iterates steps E11 to E18 for as long as the user does not end the execution of the positioning assistance application.

According to one particular embodiment of the invention, a hysteresis mechanism is used to avoid oscillation between the areas Z1 and Z2 presented to the user when the user is located close to the boundary of these areas.

According to this particular embodiment of the invention, a step E15 illustrated in FIG. 2 is implemented following step E14.

Thus, in step E15, if the value of the threshold used in the comparison step E13 is equal to a first predetermined value S2 and it has been determined that the mobile terminal T1 is located in the second area Z2 (too far away in the example described here), the value of the threshold is then assigned a second predetermined value ST greater than the first value S2. Thus, in the next iteration, it is this second value ST that will be used in step E13.

In step E15, if the value of the threshold used in the comparison step E13 is equal to the second predetermined value ST and it has been determined that the mobile terminal T1 is located in the first area Z1 (optimum area in the example described here), the value of the threshold is then assigned the first value S2.

According to one variant, in order to reduce residual oscillations, in step E15, the first value S2 of the threshold is reduced so as to extend the first area Z1. The first value S2 of the threshold is a theoretical threshold value obtained through laboratory experiments. The first value S2 of the threshold is however modified only once during the execution of the method.

FIG. 3A schematically illustrates areas of the home environment, when the positioning assistance method is implemented according to another particular embodiment of the invention. For example, according to the particular embodiment described here, the user wishes to install a Wi-Fi repeater in the home environment.

To this end, three areas of the home environment are determined, using two thresholds S1, S2, with S1 being greater than S2. The positioning assistance method described with reference to FIG. 2 is modified as follows.

In step E13, the average RSSI value is compared with the two thresholds S1 and S2. On the basis of this comparison, in step E14, it is determined in which of the three areas the mobile terminal is located. The three areas are illustrated schematically in FIG. 3A as:

an area ZOPT located at an optimum distance from the home gateway, defined by the locations of the home environment for which the RSSI average is between the thresholds S1 and S2, that is to say the RSSI average is greater than the threshold S2 and less than or equal to the threshold S1, an area ZTL that is too far away from the home gateway, defined by the locations of the home environment for which the RSSI average is less than or equal to the threshold S2, and an area ZTP that is too close to the home gateway, defined by the locations of the home environment for which the RSSI average is greater than the threshold S1.

According to one variant embodiment of the invention, a hysteresis mechanism is used to avoid oscillation between the areas presented to the user when the user is located close to the area boundaries; such a mechanism is illustrated by FIG. 3B.

To this end, a second threshold value S1', S2' is defined respectively for each of the thresholds S1 and S2.

The thresholds S1 and S2 are the RSSI thresholds used in the first iteration of the method or when it has been determined in step E14 that the user is located in the optimum area ZOPT.

The RSSI threshold S1' is used when it has been determined in step E14 that the user is placed in the area that is "too close", and the RSSI threshold ST is used when it has been determined in step E14 that the user is placed in the area that is "too far away".

To this end, in step E15, if it has been determined that the mobile terminal T1 is located in the area ZOPT and that the threshold at the boundary between the area ZOPT and the area ZTP is equal to S1, the value of the threshold between the area ZOPT and the area ZTP becomes S1'. Thus, in the next iteration of the method, the threshold value S1' will be used for the boundary between ZOPT and ZTP.

When the threshold is equal to S1' and it has been determined that the mobile terminal T1 is located in the area ZTP, the value of the threshold between the area ZOPT and the area ZTP becomes S1 again. Thus, in the next iteration of the method, the threshold value S1 will be used for the boundary between ZOPT and ZTP.

The same hysteresis mechanism is used for the value of the threshold between the area ZTL and ZOPT with the thresholds S2' and S2. If it has been determined that the mobile terminal T1 is located in the area ZTL, and that the threshold at the boundary between the area ZTL and the area ZOPT is equal to S2', the value of the threshold between the area ZTL and the area ZOPT becomes S2. Thus, in the next iteration of the method, the threshold value S2 will be used for the boundary between ZTL and ZOPT.

When the threshold is equal to S2 and it has been determined that the mobile terminal T1 is located in the area ZOPT, the value of the threshold between the area ZOPT and the area ZTL becomes S2'. Thus, in the next iteration of the method, the threshold value S2' will be used for the boundary between ZTL and ZOPT.

Even after averaging the signal levels, the RSSI may still oscillate. Specifically, the number of RSSI samples used to calculate the average should absolutely remain limited, as otherwise this would introduce inertia into the evaluation of the positioning.

As a result, when the user is located at the edge of the "optimum" area, a slight "stray" oscillation of the RSSI could cause him to pass into the area that is "too close" or "too far away", and the hysteresis mechanism described above would then force him to move in order to return to the optimum area, while the user is however actually in the optimum area.

To solve this problem, the "optimum" area considered by the application is extended slightly in both directions in comparison with the theoretical "optimum" area, as illustrated by FIG. 3C.

In FIG. 3C, the threshold S1 between the areas ZOPT and ZTP is increased by a value d1 so as to move the boundary between the two areas toward the area ZTP. The area ZOPT is thus enlarged.

The threshold S2 between the areas ZOPT and ZTL is decreased by a value d2 so as to move the boundary between the two areas toward the area ZTL. The area ZOPT is thus enlarged.

Such shifting is performed for example once in step E15 or else when the method is initialized.

The amplitude of the extension may be greater at the boundary with the area ZTL that is "too far away" in comparison with that performed at the boundary with the area ZTP that is "too close". Specifically, at the boundary with the area ZTL that is "too far away", it is essential not to indicate to the user that he is too far away, when in reality his position is still good, since this would limit the amplitude of Wi-Fi coverage extension.

On the other hand, at the boundary with the area ZTP that is "too close", it is not important to indicate to the user that he is too close, when in reality his position is in the optimum area ZOPT, since this will simply incite the user to move his Wi-Fi repeater slightly further away from the home gateway, which will in the process increase the amplitude of the Wi-Fi coverage extension.

By virtue of the positioning assistance method described above according to any one of the particular embodiments of the invention, a user is thus guided so as to find an optimum location in his home environment for installing a Wi-Fi repeater or any home equipment requiring a Wi-Fi connection to the home gateway. The user thus benefits from the best Wi-Fi performance in his home environment.

According to one particular embodiment of the invention, the threshold or thresholds used by the mobile terminal to implement the positioning assistance method are obtained by the mobile terminal from a database BDD (in FIG. 1). For example, in step E10 of launching the positioning assistance application, the mobile terminal T1 may interrogate the database BDD via the home gateway PAS and the communication network Res in order to obtain the threshold values to be used.

As a variant, the threshold values are stored in the database BDD in association with at least one feature of the mobile terminal T1. According to this variant, when the mobile terminal T1 interrogates the database BDD, it supplies information indicative of this feature such that the database BDD sends it the corresponding threshold values. The threshold values may thus be adapted on the basis of the features of the mobile terminal implementing the positioning assistance method. For example, such a feature of the mobile terminal may be a type of operating system of the terminal, a type of Wi-Fi connection, etc.

According to another variant, the threshold values are stored in the database BDD in association with a feature relating to the home equipment to be installed or to a service to be provided by this equipment. For example, such features may be the power of a Wi-Fi repeater, a data rate level to be provided by the Wi-Fi link, a type of data to be exchanged on the link, etc.

FIG. 4A schematically illustrates the home environment of a user and the determination of a placement area at a given time, during the execution of the positioning assistance method according to one particular embodiment of the invention. For example, when the positioning assistance application is launched, the user equipped with the mobile terminal T1 is located close to the home gateway PAS, and at the end of at least one iteration of steps E11 to E18 of the method described with reference to FIG. 2, the mobile terminal T1 displays a message m1 to the user indicating to him that he is in the area that is too close to the home gateway PAS. The application may indicate to the user to move to the area with poor Wi-Fi coverage.

FIG. 4B schematically illustrates the home environment of a user and the determination of a placement area at another given time, during the execution of the positioning assistance method according to one particular embodiment of the invention. In FIG. 4B, the user has moved toward the area ZNC with poor coverage. At the end of iterations of steps E11 to E18 of the method described with reference to FIG. 2, the mobile terminal T1 still displays the message m1 to the user indicating to him that he is still in the area that is too close to the home gateway PAS.

FIG. 4C schematically illustrates the home environment of a user and the determination of a placement area at another given time, during the execution of the positioning assistance method according to one particular embodiment of the invention. In FIG. 4C, the user has again moved toward the area ZNC with poor coverage. At the end of iterations of steps E11 to E18 of the method described with reference to FIG. 2, as soon as the user enters the "optimum" area, the application indicates to him this change to the "optimum" area, without oscillating between the area that is "too close" and the "optimum" area, though the message "ok".

The user may then connect his Wi-Fi repeater around his current position, or else search for another optimum position if this one does not suit him.

Outputting, to the user, the determination of the area in which he is located has been described above by way of a message displayed to the user. However, such outputting may be different, for example by displaying a symbol associated with a color code, or else an acoustic output, for example via an acoustic signal or an audio message. Other types of output are of course possible.

FIG. 5 illustrates a device DISP configured so as to implement the positioning assistance method according to one particular embodiment of the invention.

According to one particular embodiment of the invention, the device DISP has the conventional architecture of a mobile telephone, such as a smartphone, and comprises in particular a memory MEM, a processing unit UT, equipped for example with a processor PROC, and driven by the computer program PG stored in memory MEM. The computer program PG comprises instructions for implementing the steps of the method for assisting with the positioning of a home equipment as described above when the program is executed by the processor PROC.

On initialization, the code instructions of the computer program PG are for example loaded into a memory, before being executed by the processor PROC. The processor PROC of the processing unit UT in particular implements the steps of the method for assisting with the positioning of a home equipment according to any one of the particular embodiments described with reference to FIGS. 2 and 3A-3C according to the instructions of the computer program PG.

The device DISP comprises a communication module COM1 configured so as to establish communications with an IP network, and/or a home gateway PAS using Wi-Fi technology. According to one particular embodiment of the invention, the device DISP comprises a communication module COM2 configured so as to establish communications via a 3G/4G or 5G mobile communication network.

Although the present disclosure has been described with reference to one or more examples, workers skilled in the art will recognize that changes may be made in form and detail without departing from the scope of the disclosure and/or the appended claims.

The invention claimed is:

1. A method for assisting with positioning of an equipment capable of connecting to a Wi-Fi local area network of a home gateway of a user, the method being implemented by a mobile terminal placed in a home environment of the user, comprising:
receiving, from the home gateway, and at successive time intervals, information representative of a level of a Wi-Fi signal emitted by the mobile terminal and received by the home gateway,
calculating an average signal level value from signal levels received by the mobile terminal during a sliding time window of a determined duration,
comparing the average signal level value with a value of at least one determined threshold, the comparing comprising,
when said average value is greater than said value of the determined threshold, determining that the mobile terminal is located in a first area of the home environment,
when said average value is less than or equal to said value of the determined threshold, determining that the mobile terminal is located in a second area of the home environment,
wherein the first area and the second area correspond respectively to an area too close to the home gateway and an area optimum with respect to the home gateway, when the determined threshold corresponds to a first threshold,
wherein the first area and the second area correspond respectively to an area optimum with respect to the home gateway and to an area too far away from the home gateway, when the determined threshold corresponds to a second threshold, and
wherein the value of the first threshold is greater than the value of the second threshold, and
outputting, to a user of the mobile terminal, information representative of the area of the home environment in which the mobile terminal is located with respect to the home gateway, on the basis of the results of the comparison.

2. The method for assisting with the positioning of an equipment as claimed in claim 1, wherein:
when the value of the determined threshold is equal to a first predetermined value and the mobile terminal determines that the mobile terminal is located in the second area, the value of the determined threshold is assigned a second predetermined value greater than the first value, and
when the value of the determined threshold is equal to the second predetermined value and the mobile terminal determines that the mobile terminal is located in the first area, the value of the determined threshold is assigned the first predetermined value.

3. The method for assisting with the positioning of an equipment as claimed in claim 2, wherein:
when the mobile terminal determines that the mobile terminal is located in the second area and that the second area corresponds to the area said to be optimum with respect to the home gateway, the second value of the first threshold is increased by a third predetermined value, and
when the mobile terminal determines that the mobile terminal is located in the first area and that the first area corresponds to the area said to be optimum with respect to the home gateway, the first value of the second threshold is decreased by a fourth predetermined value.

4. The method for assisting with the positioning of an equipment as claimed in claim 3, wherein the fourth value is greater than the third value.

5. The method for assisting with the positioning of an equipment as claimed in claim 1, furthermore comprising the mobile terminal obtaining at least one value of said threshold from a database.

6. The method for assisting with the positioning of an equipment as claimed in claim 5, wherein the at least one value is stored in association with at least one feature of the mobile terminal.

7. The method for assisting with the positioning of an equipment as claimed in claim 5, wherein the at least one value is stored in association with at least one feature of said equipment to be positioned.

8. A device for assisting with the positioning of an equipment capable of connecting to a Wi-Fi local area network of a home gateway of a user, the positioning assistance device being movable in a home environment of the user, the positioning assistance device comprising at least one processor configured so as to:
- receive, from the home gateway, and at successive time intervals, information representative of a level of a Wi-Fi signal emitted by the device and received by the home gateway,
- calculate an average signal level value from signal levels received by the device during a time window of a determined duration,
- compare the average signal level value with a value of at least one determined threshold,
- said compare comprising,
  - when said average value is greater than said value of the determined threshold, determining that the mobile terminal is located in a first area of the home environment,
  - when said average value is less than or equal to said value of the determined threshold, determining that the mobile terminal is located in a second area of the home environment,
  - wherein the first area and the second area correspond respectively to an area said to be too close to the home gateway and an area said to be optimum with respect to the home gateway, when the determined threshold corresponds to a first threshold,
  - wherein the first area and the second area correspond respectively to an area said to be optimum with respect to the home gateway and to an area said to be too far away from the home gateway, when the determined threshold corresponds to a second threshold, and
  - wherein the value of the first threshold is greater than the value of the second threshold, and
- output, to a user of the device, information representative of the area of the home environment in which the device is located with respect to the home gateway, on the basis of the results of the comparison.

9. The device as claimed in claim 8, wherein the device is comprised in a mobile terminal.

10. A non-transitory computer-readable medium comprising instructions stored thereon for implementing a method for assisting with positioning of an equipment capable of connecting to a Wi-Fi local area network of a home gateway of a user, when the instructions are executed by a processor of a device, wherein the device is movable in a home environment of the user and wherein the instructions configure the device to:
- receive, from the home gateway, and at successive time intervals, information representative of a level of a Wi-Fi signal emitted by the device and received by the home gateway,
- calculate an average signal level value from signal levels received by the device during a time window of a determined duration,
- compare the average signal level value with a value of at least one determined threshold, said compare comprising,
  - when said average value is greater than said value of the determined threshold, determining that the mobile terminal is placed in a first area of the home environment,
  - when said average value is less than or equal to said value of the determined threshold, determining that the mobile terminal is placed in a second area of the home environment,
  - wherein the first area and the second area correspond respectively to an area said to be too close to the home gateway and an area said to be optimum with respect to the home gateway, when the determined threshold corresponds to a first threshold,
  - wherein the first area and the second area correspond respectively to an area said to be optimum with respect to the home gateway and to an area said to be too far away from the home gateway, when the determined threshold corresponds to a second threshold, and
  - wherein the value of the first threshold is greater than the value of the second threshold, and
- output, to a user of the device, information representative of the area of the home environment in which the device is located with respect to the home gateway, on the basis of the results of the comparison.

11. A method for assisting with positioning of an equipment capable of connecting to a Wi-Fi local area network of a home gateway of a user, the method being implemented by a mobile terminal placed in a home environment of the user, comprising:
- receiving, from the home gateway, and at successive time intervals, information representative of a level of a Wi-Fi signal emitted by the mobile terminal and received by the home gateway,
- calculating an average signal level value from signal levels received by the mobile terminal during a sliding time window of a determined duration,
- comparing the average signal level value with values of at least a first threshold and a second threshold, wherein the value of the first threshold is greater than the value of the second threshold,
- determining a position of the mobile terminal relative to the home gateway according to the following relationships:
  - when said average value is greater than the value of the first threshold, determining that the mobile terminal is located in an area of the home environment too close to the home gateway,
  - when said average value is less than or equal to the value of the first threshold and greater than the value of the second threshold, determining that the mobile terminal is located in an optimum area of the home environment with respect to the home gateway, and
  - when said average value is less than or equal to the value of the second threshold, determining that the mobile terminal is located in an area of the home environment too far away from the home gateway, and
- outputting, to a user of the mobile terminal, information representative of the area of the home environment in which the mobile terminal is located with respect to the home gateway, on the basis of results of the determining.

* * * * *